United States Patent
Presenz et al.

(10) Patent No.: US 6,881,477 B2
(45) Date of Patent: Apr. 19, 2005

(54) METHOD FOR PRODUCING A POLYAMIDE COMPOUND

(75) Inventors: Ulrich Presenz, Trin (CH); Stephan Schmid, Domat/Ems (CH); by Rosmarie Hartmann, legal representative, Domat/Ems (CH); Hans Rudolf Luck, Comat/Ems (CH)

(73) Assignee: EMS-Chemie AG, Domat/Ems (CH)

( * ) Notice: Subject to any disclaimer, the term of this patent is extended or adjusted under 35 U.S.C. 154(b) by 18 days.

(21) Appl. No.: 10/294,604

(22) Filed: Nov. 15, 2002

(65) Prior Publication Data

US 2003/0091823 A1 May 15, 2003

(30) Foreign Application Priority Data

Nov. 15, 2001 (CH) .............................. 2095/01

(51) Int. Cl.$^7$ .......................... B32B 5/16; B32B 17/02; B29D 22/00; C08G 69/04; C08F 6/00
(52) U.S. Cl. .................... 428/357; 428/34.1; 428/34.6; 428/34.7; 428/36.9; 428/36.91; 428/402; 528/170; 528/310; 528/312; 528/322; 528/332; 528/335; 528/336; 528/480; 528/486; 528/499; 528/502 R
(58) Field of Search .............................. 428/34.1, 34.6, 428/34.7, 36.9, 36.91, 357, 402, 395; 528/170, 310, 312, 322, 332, 335, 336, 480, 486, 499, 502 R; 525/925–926

(56) References Cited

U.S. PATENT DOCUMENTS

| | | | |
|---|---|---|---|
| 2,997,463 A | | 8/1961 | Lum et al. |
| 4,014,957 A | * | 3/1977 | Kirsch et al. ................ 525/425 |
| 4,398,642 A | | 8/1983 | Okudaira et al. |
| 4,535,901 A | | 8/1985 | Okudaira et al. |
| 4,728,549 A | | 3/1988 | Shimizu et al. |
| 4,936,651 A | * | 6/1990 | Tani ........................... 385/109 |
| 5,612,446 A | * | 3/1997 | Presenz et al. ............. 528/310 |
| 5,686,192 A | * | 11/1997 | Presenz et al. .......... 428/474.4 |
| 5,708,125 A | * | 1/1998 | Liedloff et al. ............. 528/310 |
| 5,723,567 A | * | 3/1998 | Hewel et al. ................ 528/310 |
| 6,303,741 B1 | * | 10/2001 | Tanaka ....................... 528/332 |
| 6,592,350 B1 | * | 7/2003 | Chszaniecki .................. 425/67 |
| 6,740,733 B1 | * | 5/2004 | Lee et al. .................... 528/499 |

FOREIGN PATENT DOCUMENTS

| | | |
|---|---|---|
| EP | 0 071 000 A2 | 2/1983 |
| EP | 0 084 661 B1 | 8/1983 |
| EP | 0 288 972 A2 | 11/1988 |
| EP | 0 301 719 | 2/1989 |
| EP | 0 409 666 A2 | 1/1991 |

OTHER PUBLICATIONS

European Patent Office: Patent Abstracts of Japan: Abstract for JP 09228142, "Polyamide Fiber for Filter Cloth", Mitsubishi Gas Chem Co. Inc. (Sep. 2, 1997).

European Patent Office: Patent Abstracts of Japan: Abstracts for JP 63267549, "Gas–Barrier Multi–Layer Structure", Japan Styrene Paper Co. Ltd (Nov. 4, 1988).

"2.3: Hydrolytic Polymerization", *Nylon Plastics Handbook*, editor M.I. Kohan (1955).

* cited by examiner

Primary Examiner—P. Hampton Hightower
(74) Attorney, Agent, or Firm—Browdy and Neimark, P.L.L.C.

(57) ABSTRACT

A method is disclosed for producing a polyamide molding compound which includes the following method steps: addition and dissolving of m-xylylene diamine and dicarboxylic acids, which include adipic acid and aromatic dicarboxylic acids, with water and additives in a dissolving chamber and production of a mixture, the sum of the aromatic dicarboxylic acids added being 2 mol-percent to 15 mol-percent (in relation to the addition of dicarboxylic acids); transfer of the mixture into a reaction vessel and polycondensation of the mixture in this reaction vessel; granulation of the polycondensate; drying of the granulate. This method is distinguished in that the polycondensation is performed at a pressure of at most 10 bar and a temperature of 255° C. to 270° C., the pressure being built up while heating the reaction vessel to 255° C. to 270° C. and—immediately after the mixture has reached the maximum temperature—being reduced to atmospheric conditions while maintaining a temperature of 255° C. to 270° C., and the polycondensation being continued at this temperature and a pressure of less than 800 millibar; and the granulate is subjected to an underwater crystallization before drying.

31 Claims, No Drawings

METHOD FOR PRODUCING A POLYAMIDE COMPOUND

FIELD OF THE INVENTION

The present invention relates to a method for producing a polyamide molding compound, according to the preamble of independent Claim 1, which includes the following method steps: addition and dissolving of m-xylylene diamine and dicarboxylic acids, which include adipic acid and aromatic dicarboxylic acids, with water and additives in a dissolving chamber and production of a mixture; transfer of the mixture into a reaction vessel and polycondensation of the mixture in this reaction vessel; granulation of the polycondensate and drying the granulate. The production of a polyamide molding compound typically includes these steps, the recipe and the respective method parameters of these steps mutually influencing one another. An additional, essential step relates to the crystallization of the granulate. The typical hydrolytic production of polyamides and/or copolyamides in batch methods is, for example, described in the "Nylon Plastics Handbook" (1955, Editor M. I. Kohan) on page 17 et seq., and is known. The batch production of PA66 (cf. ibid. pages 19–22) is also described there.

RELATED PRIOR ART

Polyamides, which are suitable, for example, as barrier layers and/or diffusion-inhibiting layers for gases such as oxygen or carbon dioxide in bottles produced from polyethylene terephthalate (PET), are known. Thus, for example, U.S. Pat. No. 4,398,642 describes an oriented multilayer container made of at least two plastics (polyester and polyamide containing MXDA). U.S. Pat. No. 4,535,901 discloses a multilayer bottle having three or more layers made of at least two plastics (polyester and polyamide, EVOH, polyolefin, polyacrylic, PVC, PC, or PS), the neck of the bottle being implemented with only one layer. U.S. Pat. No. 4,728,549 discloses a 5-layer bottle made of polyester and a polyamide containing MXDA, the neck of the bottle also being implemented with only one layer. The bottle wall is stretched and includes defined layer thicknesses and compositions. During the injection molding of molded parts for PET bottles blown in the mold, however, it has been shown that polyamides—particularly those including m-xylylene diamine—have poor flow properties for producing the barrier layers in these molded parts and tend to form an irregular melt front, a "finger formation" (cf., for example, European Patent 0 288 972). This results in an incomplete diffusion barrier in the finished PET bottle, which is unacceptable. Homopolyamide MXD6, which is obtained by a polycondensation reaction from adipic acid and m-xylylene diamine (cf. European Patent 0 288 972), is produced according to the methods described in European Patent 0 071 000 and European Patent 0 084 661. Methods for providing polyamide compounds containing m-xylylene diamine which have improved gas barrier properties are known from European Patent 0 409 666. If particularly high requirements are placed on an oxygen barrier, the goal is typically achieved by the use of oxygen scavengers, described in European Patent 0 301 719. However, the oxygen scavenger reduces the melt viscosity of the polyamide during processing. The carbon dioxide barrier is not influenced by oxygen scavengers, due to which the shelf life of beverages having carbon dioxide may be greatly restricted and/or insufficient in spite of the use of an oxygen scavenger.

OBJECT AND SUMMARY OF THE INVENTION

The object of the present invention is to suggest an alternative method and a compound which include the use of m-xylylene diamine and are suitable for producing a higher-quality polyamide molding compound for the production of a diffusion-restricting layer, which is improved in relation to the homopolyamide, for carbon dioxide in packages, particularly in bottles produced from polyethylene terephthalate (PET).

This object is achieved with the method and the composition which are defined by the features of independent claim 1. Further features according to the present invention result from the dependent claims.

Advantages of the composition according to the present invention, which is obtained using the method according to the present invention, include a carbon dioxide barrier improved in relation to PAMXD6, a more uniform viscosity, improved flow properties, and higher transparency of the copolyamide.

EXPERIMENTS

In all experiments, additives, such as 25 weight-percent water for a clear and homogeneous salt solution, anti-foaming agent for suppressing the formation of foam, catalyst to accelerate the polycondensation, and diamine excess to compensate for diamine losses, were added depending on the method.

Experiment 1

In a first experimental series (composition 1, using acetic acid) the homogeneous mixture, produced in a dissolving chamber, of isophthalic acid (7.934 kg), acetic acid (0.298 kg), adipic acid (51.203 kg), and m-xylylene diamine (54.846 kg) was transferred into an autoclave, where the mixture was heated up to 280° C. During the heating, the pressure increased due to evaporating water. Through appropriate regulation using an outlet valve, it was ensured that the pressure produced through evaporating water did not exceed a value of 20 bar and/or could be kept at 20 bar. Immediately after reaching the maximum temperature of 280° C., the water steam was discharged and the mixture was expanded at atmospheric pressure. At the same time, the polycondensation began and the torque on the stirrer of the autoclave increased strongly in accordance with the degree of polycondensation reached. Subsequently, the polycondensate was granulated and dried in a way known per se.

During drying, the granulate agglutinated. In addition, the granulate had many inclusions, the number of inclusions increasing greatly as the batch number increased. The pronounced yellow color of the granulate was interpreted as arising from too high a temperature stress of the polycondensate. Although a significantly smaller proportion of aromatic dicarboxylic acids was used than in the related art (cf. European Patent 0 288 972), the granulate obtained from the first compound could not be used for the production of a barrier layer in PET bottles, because it still had flow properties which were too poor and the melt front tended toward the undesired "finger formation" during injection molding of the molded parts. The agglutination of the granulate during drying also caused a significant disadvantage in the handling of the material, so that there was also need for improvement in this regard.

Experiment 2

In a second experimental series, the polycondensation of compound 1 was performed at a pressure of 3 bar and a temperature of 270° C. It turned out that a significantly lower pressure (in a refinement of the teaching from U.S. Pat. No. 2,997,463) provided improved results. The pressure was—immediately after the mixture had reached the maximum temperature—reduced to atmospheric conditions and the polycondensation was continued at 300 millibar. The partial vacuum shortened the polycondensation time and thus helped to improve the product quality and accelerate the method.

On the basis of this second experimental series, a maximum pressure of 10 bar and a maximum temperature of 255° C. to 270° C. is preferred for the polycondensation. A pressure of 1 to 6 bar is preferred for the heating before the polycondensation; a pressure of 1 to 3 bar is especially preferred. In addition, it is important that the pressure—immediately after the mixture has reached the maximum temperature—is reduced to atmospheric conditions and the polycondensation is continued at a pressure of less than 800 millibar, preferably less than 500 millibar, especially preferably less than 300 millibar, very especially preferably less than 100 millibar. An especially preferred temperature range during heating under pressure is 260° C. to 270° C.; a temperature of 270° C. (+/− the control precision of the facility used) is especially preferred. For relieving the pressure and/or in the vacuum phase, a temperature range of 260° C. to 270° C. is especially preferred, a temperature of 265° C. (+/− the control precision of the facility used) being very especially preferred.

A further improvement according to the present invention relates to the use of a monocarboxylic acid having a pKa value greater than 4.76 as an additive for regulating the chain length of the polymers, i.e., as a chain regulator. Surprisingly, it has been found that the acetic acid typically used, having a pKa value of 4.76, is not suitable, because the screen for holding back gel particles and for preventing these gel particles from entering the nozzle plate of a feeder head known per se always becomes clogged. It has been found that the use of benzoic acid (pKa value=4.21) also produces poor results. In the experiment, propionic acid (pKa value=4.88) was surprisingly found to be suitable, it acts as a chain regulator and simultaneously reduces the number of gel particles and inclusions, so that the screen no longer clogs. It was therefore recognized that the pKa value of the monocarboxylic acid used as a chain regulator is preferably to be above the pKa value of 4.76. If propionic acid is suitable as a chain regulator, then other monocarboxylic acids having at least 4 carbon atoms, such as valeric acid and the like, may also be used. However, the solubility in water decreases with increasing chain length, so that $C_{18}$ monocarboxylic acids (e.g., stearic acid) may be assumed as the upper limit for use as a chain regulator.

For further improving the results, particularly for producing less yellowing, phosphitic and/or phenolic heat stabilizers, such as Hostanox PAR24 (tris(2,4-di-tert.butylphenyl)phosphite, 0.025 kg) and/or Irganox 1010 (tetrakis[(3,5-di-tert.Butyl-4-hydroxy)hydrocinnamic acid methylester]methane, 0.025 kg), may be added to the mixture. These heat stabilizers have the advantage that their use in packaging materials which come into contact with food is permitted by the U.S. Food and Drug Administration (FDA). The same is also true for Irganox 1330. The improvement achieved primarily relates to reduced yellowing and reduced gel formation.

A granulate which—even after 10 sequential batches—only had a few inclusions and no longer displayed a yellow color resulted from this second series of experiments. The relative viscosity of the material (measured in 0.5% m-cresol) was 1.57. This value was so low that the material was not suitable for producing barrier layers in PET bottles. In addition, the granulate still agglutinated during drying, so that the production method had to be further improved in consideration of easier handling.

Experiment 3

In a third experimental series, the granulate (composition 1, but using propionic acid, 0.281 kg) was subjected to underwater crystallization at 75° C. for two hours. Based on the results achieved, temperature ranges from 55° C. to 80° C. are preferred, and temperature ranges from 70° C. to 80° C. are especially preferred. A time from 2 to 12 hours has been shown to be a favorable dwell time of the granulate. To determine this dwell time of the granulate in water exactly, the underwater crystallization is preferably performed until the originally transparent granulate appears opaque. Depending on the temperature selected, the duration of the underwater crystallization may—on the basis of this feature—also be adjusted to the batch duration conditioned by the rest of the method. The granulate subjected to such an underwater crystallization no longer agglutinates during drying and may be pourably packaged or processed further.

To elevate the relative viscosity, the material was subjected to a solid phase secondary condensation. In this case, the granulate was first brought to the secondary condensation temperature in an inert gas flow, while moving strongly and with increasing gas temperature. This introduction of the gas with increasing temperature is necessary because otherwise—if gas heated to the secondary condensation temperature is supplied directly—agglutination of the granulate and therefore blocking of the process occurs at product temperatures between 100° C. and 130° C. and/or between 150° C. and 170° C. (in spite of strong movement).

In the experiment, the granulate was kept at 165° C. for 20 minutes and the solid phase secondary condensation was performed at 180° C. for 6 hours.

On the basis of this experimental series, a temperature of 160° C. to 200° C. is preferred for the solid phase secondary condensation. A temperature range from 170° C. to 190° C. is especially preferred and a temperature range from 175° C. to 185° C. is very especially preferred. Nitrogen gas is preferred as an inert gas, a temperature range between +10° C. and −60° C. being preferred as a dew point range of the nitrogen gas and a temperature range between −20° C. and −60° C. being especially preferred. If care is taken to heat the granulate step-by-step, solid phase secondary condensation in vacuum is also possible, i.e., at a pressure of less than 800 millibar. In this case, a pressure of less than 50 millibar is preferred. A pressure of less than 10 millibar is especially preferred and a pressure of less than 2 millibar is very especially preferred.

The relative viscosity of the polymer may be influenced via the duration of the solid phase secondary condensation, a relative viscosity of the material (measured in 0.5% m-cresol) of 1.65 to 1.75 being preferred and a relative viscosity of 1.7 being especially preferred.

This granulate is suitable for use in the production of packages or packaging materials, particularly for food, chemicals, pigments, cosmetics, and the like. Even the production of a diffusion-restricting layer for oxygen and/or carbon dioxide in packages, particularly in bottles, produced from polyethylene terephthalate (PET), for soft drinks is possible, as "finger formation" does not occur. The granulate of this copolyamide may thus be used as a barrier material in the field of extrusion blowmolded and/or injection stretch blowmolded containers and bottles, flat films and blown films and/or tubes for bulk goods. The production of glass fiber reinforced components, particularly in the vehicle, optics, household appliance, electrical, and electronics industries, is possible without anything further using this granulate.

If a diffusion-restricting layer for oxygen is desired in beer bottles produced from polyethylene terephthalate (PET), i.e., in containers for bulk goods which place especially high requirements on the oxygen barrier, then the diffusion barrier produced using this granulate according to experiment 3 is still unsatisfactory. For such diffusion barriers, "oxygen scavengers" or oxygen-trapping substances in the form of an organic metal compound (e.g., carboxylic acid salts of iron, cobalt, and nickel) have proven themselves, as is known from, for example, European Patent 0 301 719. However, the viscosity of the copolyamides is lowered by adding the oxygen scavenger to the granulate, so that it is no longer suitable for producing a diffusion-restricting layer for oxygen in packages, particularly in bottles produced from polyethylene terephthalate (PET). However, through an additional solid phase secondary condensation (keeping the granulate at 165° C. for 20 minutes; solid phase secondary condensation at 180° C. for 6 hours), the relative viscosity may be elevated back to the preferred value of 1.65 to 1.75, and/or to the especially preferred value of 1.7.

Experiment 4

In a fourth experimental series, a nucleation additive in the form of a pyrogenic silicic acid (Aerosil COK 0.050 kg) was added to composition 1 during the production of the mixture. The method was performed using propionic acid as a regulator and with the addition of heat stabilizers (as in experiment 2), as well as using underwater crystallization and solid phase secondary condensation (as in experiment 3). In this way, the clarity and/or the transparency of the polymer was additionally improved.

Experiment 5

In a fifth experimental series, the composition was varied by different additives of aromatic dicarboxylic acids during the production of the mixture.

A comparison of the recipes according to the present invention (all amounts in mol-percent in relation to the addition of dicarboxylic acids) with the related prior art is shown in Table 1. Composition 1 (using propionic acid as a chain regulator) was produced in experiment 3 or in experiment 4, compositions 2 to 5 were obtained by varying the proportions of aromatic dicarboxylic acids in experiment 5.

The measurement of the melting point (in ° C.) and/or of the glass transition temperature (in ° C.) was carried out in a standard way. To measure the $CO_2$ permeation, a non-stretched and non-oriented flat film having an average thickness of 50 micrometers was produced. The $CO_2$ permeation (in $cm^3/m^2$*days*bar) was measured on this film at a relative ambient humidity of 85% and a temperature of 23° C. At least the values for composition 1 according to the present invention and the control are significant values for the $CO_2$ permeation.

TABLE 1

| | Related art | Composition according to the present invention | | | | |
|---|---|---|---|---|---|---|
| | EP 0 288 972 | 1 | 2 | 3 | 4 | Control |
| MXDA | 100 | 100 | 100 | 100 | 100 | 100 |
| IPS | 20–30 | 12 | — | 2.5 | — | — |
| TPS | 5–20 | — | 5 | 2.5 | 12 | — |
| AS | 55–70 | 88 | 95 | 95 | 88 | 100 |
| Melting point (° C.) | 215 | 232 | 230 | 225 | 234 | |
| Glass transition temperature (° C.) | 96 | 94 | 292 | 95 | 86 | |
| $CO_2$ permeation ($cm^3/m^2$ * d * bar) | 17 | — | 9 | 23 | 29 | |
| BADBA concentration (weight-percent) | 0.45 | 0.30 | 0.25 | 0.49 | 0.18 | |

It may be seen in Table 1 that the barrier function for reducing the $CO_2$ permeation may be improved using at least compositions 1, 3, and 4 according to the present invention. The value for composition 2 was not measured due to poor film quality. In addition, the preferred proportions of the aromatic dicarboxylic acids (all amounts in mol-percent in relation to the addition of dicarboxylic acids) may be seen from this table, with the abbreviation MXDA standing for m-xylylene diamine, IPS for isophthalic acid, TPS for terephthalic acid, and AS for adipic acid.

The diamine components are made completely or essentially of m-xylylene diamine. In order to purposely control specific properties, such as crystallization speed, melting point, glass transition temperature, flexibility, transparency, puncture resistance, toughness, composite adhesion, and gas barriers, other diamines such as hexamethylene diamine, diaminobutane, methylpentamethylene diamine, 3,3'-dimethyl-4,4'-diaminodicyclohexylmethane, 1,6-diamino-2,2,4-trimethylhexane, 1,6-diamino-2,4,4-trimethylhexane, p-xylylene diamine, decane diamine, dodecane diamine, 2,2-bis(p-aminocyclohexyl)propane, bis(p-aminocyclohexyl)methane, isophorone diamine, polypropylene glycol diamine, norbornene diamine, 1,3-bis(aminomethyl)cyclohexane, or TCD-diamine may also be used in small quantities (i.e., up to approximately 10%).

The use of small quantities (up to approximately 10%) of other aliphatic dicarboxylic acids, amino acids, and lactams, such as succinic acid, glutaric acid, azelaic acid, sebacic acid, dodecanoic acid, dimeric acid, amino hexanoic acid, amino undecanoic acid, amino dodecanoic acid, caprolactam, or dodecanoic lactam, is also possible. For example, isophthalic acid, terephthalic acid, naphthalene carboxylic acid, tert-butyl isophthalic acid, or phenylindane dicarboxylic acid may be used as aromatic dicarboxylic acids. Isophthalic acid, terephthalic acid, or mixtures of these are preferred. Isophthalic acid is particularly preferred.

As all experiments were carried out, the formation of 3,3-bis(aminomethyl)dibenzyl amine (BADBA) was observed (in a refinement of the teaching from U.S. Pat. No. 2,997,463). This byproduct is associated with undesired cross-linking reactions with the copolyamide, so that—to prevent gel formation and improve the flow behavior—the least possible formation of BADBA is desirable. In addition, it was observed that the addition of aromatic dicarboxylic acids particularly supports the formation of BADBA. The concentration of BADBA may be kept minimal through the method according to the present invention. The BADBA content was determined in that the polyamide was hydrolyzed using 6 n HCl for 24 hours at 150° C., evaporated, dried, trifluoroacetylated using trifluoroacetic acid anhydride in dichloromethane, and quantitatively determined in an HPLC facility from Waters using a UV detector (254 nm), a Symmetry C8 column from Waters, and a gradient mixture of acetonitrile/water. The BADBA concentrations resulting as a function of the composition selected may be seen in Table 1.

The alternative method according to the present invention includes the use of temperatures and pressures which are significantly below those disclosed in European Patent 0 409 666 and which contribute to a desirable reduction of the BADBA concentration.

What is claimed is:

1. A method for producing a polyamide molding compound, which includes the following method steps:
    a) addition and dissolving of m-xylylene diamine and dicarboxylic acids, which include adipic acid and aromatic dicarboxylic acids, with water and additives in a dissolving chamber and production of a mixture, the sum of aromatic dicarboxylic acids being 2 mol-percent to 15 mol-percent (in relation to the addition of dicarboxylic acids);
    b) transfer of the mixture into a reaction vessel and polycondensation of the mixture in this reaction vessel;
    c) granulation of the polycondensate;
    d) drying of the granulate;
    wherein
        the polycondensation is performed at a pressure of at most 10 bar and a temperature of 255° C. to 270° C., the pressure being built up while heating the reaction vessel to 255° C. to 270° C. and—immediately after the mixture has reached the maximum temperature—being reduced to atmospheric conditions while maintaining a temperature of 255° C. to 270° C., and the polycondensation being continued at this temperature and a pressure of less than 800 millibar;
        the granulate is subjected to an underwater crystallization before drying.

2. The method according to claim 1, wherein the aromatic dicarboxylic acids are added in the form of 5 to 15 mol-percent isophthalic acid and/or terephthalic acid (in relation to the addition of dicarboxylic acids).

3. The method according to claim 1, wherein the aromatic dicarboxylic acids are added in the form of 10 to 15 mol-percent isophthalic acid (in relation to the addition of dicarboxylic acids).

4. The method according to claim 1, wherein the aromatic dicarboxylic acids are added in the form of 12 mol-percent isophthalic acid (in relation to the addition of dicarboxylic acids).

5. The method according to claim 3, wherein the aromatic dicarboxylic acids are added in the form of 12 mol-percent isophthalic acid (in relation to the addition of dicarboxylic acids).

6. The method according to claim 1, wherein the polycondensation is carried out at a pressure of 1 to 6 bar and a temperature of at most 255° C. to 270° C., the pressure being built up while heating the reaction vessel to 260° C. to 270° C. and—immediately after the mixture has reached the maximum temperature—being reduced to atmospheric conditions while maintaining a temperature of 260° C. to 270° C., and the polycondensation being continued at this temperature and a pressure of less than 500 millibar.

7. The method according to claim 1, wherein the polycondensation is carried out at a pressure of 1 to 3 bar and a temperature of at most 255° C. to 270° C., the pressure being built up while heating the reaction vessel to 270° C. (+/− the control precision of the facility used) and—immediately after the mixture has reached the maximum temperature— being reduced to atmospheric conditions while maintaining a temperature of 265° C. (+/− the control precision of the facility used), and the polycondensation being continued at this temperature and a pressure of less than 300 millibar.

8. The method according to claim 1, wherein the underwater crystallization is carried out at a temperature of 55° C. to 80° C.

9. The method according to claim 8, wherein the underwater crystallization is carried out at a temperature of 70° C. to 80° C.

10. The method according to claim 8, wherein the underwater crystallization is carried out for at least 2 hours and/or until the granulate appears opaque.

11. The method according to claim 1, wherein a regulator in the form of a monocarboxylic acid having a pKa value of greater than 4.76 is added to the mixture in step a).

12. The method according to claim 11, wherein propionic acid is used as said chain length regulator.

13. The method according to claim 1, wherein at least one heat stabilizer selected from the group consisting of phosphitic and phenolic heat stabilizers is added to the mixture in step a).

14. The method according to claim 13, wherein at least one compound selected from the group consisting of (tetrakis[(3, 5-di-tert.Butyl-4-hydroxy) hydrocinnamic acid methylester]methane and (tris(2,4-di-tert.butylphenyl) phosphite is used as said heat stabilizer.

15. The method according to claim 1, wherein a nucleation additive in the form of a pyrogenic silicic acid is added to the mixture in step a).

16. The method according to claim 1, wherein sodium hypophosphite is used as a polycondensation catalyst and heat stabilizer.

17. The method according to claim 1, wherein the granulate is subjected to a solid phase secondary condensation in an inert gas flow or in a vacuum, the granulate being preheated over a temperature profile to at least approximately the secondary condensation temperature while being moved and sub-sequently being secondarily condensed at 160° C. to 200° C.

18. The method according to claim 17, wherein nitrogen is used as an inert gas.

19. The method according to claim 17, wherein the solid phase secondary condensation is carried out in vacuum at a pressure of less than 800 millibar.

20. The method according to claim 17, wherein an oxygen scavenger in the form of an organic metal compound is mixed into the granulate after the solid phase secondary condensation.

21. A granulate of a polyamide molding compound, that is produced using a method which includes the following method steps:
    a) addition and dissolving of m-xylylene diamine and dicarboxylic acids, which include adipic acid and aromatic dicarboxylic acids, with water and additives in a dissolving chamber and production of a mixture, the sum of aromatic dicarboxylic acids being 2 mob-percent to 15 mol-percent (in relation to the addition of dicarboxylic acids);
    b) transfer of the mixture into a reaction vessel and polycondensation of the mixture in this reaction vessel;
    c) granulation of the polycondensate;
    d) drying of the granulate;

wherein
the polycondensation is performed at a pressure of at most 10 bar and a temperature of 255° C. to 270° C., the pressure being built up while heating the reaction vessel to 255° C. to 270° C. and—immediately after the mixture has reached the maximum temperature—being reduced to atmospheric conditions while maintaining a temperature of 255° C. to 270° C., and the polycondensation being continued at this temperature and a pressure of less than 800 millibar; and wherein
the granulate is subjected to an underwater crystallization before drying.

22. The granulate of claim 21, in the production of which the granulate is subjected to a solid phase secondary condensation in an inert gas flow or in a vacuum, the granulate being preheated over a temperature profile to at least approximately the secondary condensation temperature while being moved and sub-sequently being secondarily condensed at 160° C. to 200° C., wherein an oxygen scavenger in the form of an organic metal compound is mixed into the granulate after the solid phase secondary condensation.

23. In a method of using a of a polyamide molding compound in the production of packages or packaging material, comprising forming said granulate into a said package or packaging material, the improvement wherein said granulate is formed by:
  a) addition and dissolving of m-xylylene diamine and dicarboxylic acids, which include adipic acid and aromatic dicarboxylic acids, with water and additives in a dissolving chamber and production of a mixture, the sum of aromatic dicarboxylic acids being 2 mol-percent to 15 mol-percent (in relation to the addition of dicarboxylic acids);
  b) transfer of the mixture into a reaction vessel and polycondensation of the mixture in this reaction vessel;
  c) granulation of the polycondensate;
  d) drying of the granulate;
wherein
the polycondensation is performed at a pressure of at most 10 bar and a temperature of 255° C. to 270° C., the pressure being built up while heating the reaction vessel to 255° C. to 270° C. and—immediately after the mixture has reached the maximum temperature—being reduced to atmospheric conditions while maintaining a temperature of 255° C. to 270° C., and the polycondensation being continued at this temperature and a pressure of less than 800 millibar; and wherein
the granulate is subjected to an underwater crystallization before drying.

24. The method of claim 23, wherein said package or packaging material comprises a diffusion-resisting layer for a gas selected from the group consisting of oxygen and carbon.

25. The method of claim 23, wherein said package or packing material comprises a diffusion-restricting layer for a gas selected from the group consisting of oxygen and carbon dioxide wherein the granulate is subjected to a solid phase secondary condensation in an inert gas flow or in a vacuum, the granulate being preheated over a temperature profile to at least approximately the secondary condensation temperature while being moved and subsequently being secondarily condensed at 160° C. to 200° C., and wherein an oxygen scavenger in the form of an organic metal compound is mixed into the granulate after the solid phase secondary condensation.

26. The method of claim 22, wherein said package or packaging material forms a layer of a beer bottle comprising polyethylene terephthalate (PET).

27. In a method of using a granulate in the production of a glass fiber reinforced component selected from the group consisting of a vehicle component, an optical component, a household appliance, an electrical component, and an electronics component, comprising forming a said component at least in part from said granulate, the improvement wherein said granulate is a granulate according to claim 21.

28. In a method of using a granulate in the production of a glass fiber reinforced component selected from the group consisting of a vehicle component, an optical component, a household appliance, an electrical component, and an electronics component, comprising forming a said component at least in part from said granulate, the improvement wherein said granulate is a granulate according to claim 22.

29. The method according to claim 17, wherein the oxygen scavenger is selected from the group of carboxylic acid salts of iron, cobalt, and nickel.

30. The method of claim 24, wherein said package or packaging material forms a layer of bottle comprising polyethylene terephthalate (PET).

31. The method of claim 25, wherein said package or packaging material forms a layer of bottle comprising polyethylene terephthalate (PET).

* * * * *